UNITED STATES PATENT OFFICE.

ALEXANDER D. ELBERS, OF HOBOKEN, NEW JERSEY.

TREATING BLAST-FURNACE SLAG.

SPECIFICATION forming part of Letters Patent No. 278,002, dated May 22, 1883.

Application filed April 5, 1883. (No specimens.)

*To all whom it may concern:*

Be it known that I, ALEXANDER D. ELBERS, of Hoboken, in the county of Hudson and State of New Jersey, have invented certain new and useful Improvements in Treating Blast-Furnace Slag, of which the following is a specification.

This invention has reference to an improved method of treating blast-furnace slag in such a manner that a finely-pulverized white silicate is obtained that may be utilized for various applications in the ceramic and other arts, as a paint, as a plastic material, and by admixture with other substances.

The invention consists in changing the blast-furnace slag by the steam or air blast into slag fibers, known as "slag wool" or "mineral wool," then heating and fritting the said slag fibers until the fibers are reduced to white finely-granulated silicates, which are then pulverized.

It is a well-known fact that the dark coloration of slags is mainly due to their earthly sulphides, and incidentally to slight metallic admixtures; also, that slags containing earthy sulphides will evolve sulphurous-acid vapors if they are roasted in contact with atmospheric air. If, therefore, granulated or pulverized slag of suitable composition be exposed to a high temperature, but below the fuzing-point, it would seem that then the so-called "opening" of the slag and the fritting together of the silicates, freed from volatile sulphur, would take place, and thereby the desired desulphurized whitish silicates be obtained; but this reduction cannot be satisfactorily accomplished in practice, owing either to the lack of a sufficient quantity of atmospheric air, or because the fusion of a part of the charge cannot be prevented before the remaining part has been desulphurized or fritted. To supply, therefor, the required quantity of air to the slag, I prefer to change the slag first, in the well-known manner, by a steam or air blast, into slag fibers, in the loose condition of which the intermediate space is filled with air, so that the slag fibers, besides having already undergone a slight chemical change in their composition, are therefore better adapted for reduction. These slag fibers are placed into an ordinary crucible and pressed by hand into the same until its density is about one-half that of solid slag, and so that the crucible contains about one volume or more of air to one volume of slag fibers. The crucible is then heated to a temperature somewhat above red heat and retained at this high temperature for about half an hour or more, care being taken that the fusing-point is not reached. During this continuous heating the slag fibers emit sulphurous fumes, and are thereby desulphurized, then being finally fritted down into a soft white crumbling mass. Some of the metallic admixtures—such as iron, &c.—are either carried off with the sulphurous vapors, or they become concentrated in spots of darker color, which are separated by scraping from the fritted mass, when the same is taken out and broken up. After assorting the broken-up mass the finished or perfectly-reduced particles are pulverized and the incompletely-reduced parts reheated with the next charge. The product thus obtained consists, according to the composition used, of comparatively pure silicates of lime alumina and magnesia of whitish color, which can be still more improved by bleaching. It forms, either singly or by proper admixture with other pigments, a paint of considerable covering and spreading power, that possesses a high resistance against deterioration by atmospheric influences. By mixing these silicates with diluted sulphuric acid, sulphate of lime or gypsum is formed and silica acid is set free in a gelatinous state, which, when thoroughly mixed, renders the mass plastic. This readily hardens into a comparatively insoluble compound. This action of the sulphuric acid may be utilized in the arts, and thereby an improved plastic material for statuary and other ornamental purposes be obtained.

It is obvious that when the slag fibers are to be reduced on a larger scale they may be heated in retorts, muffles, and ovens of proper construction, so that the silicates may be obtained in larger quantities, and that the fibers, as well as the unfinished mass, may be mixed with such substances that facilitate reduction.

Having thus described my invention, I claim as new and desire to secure by Letters Patent—

1. The herein-described method of treating blast-furnace slag for use in the arts, which consists, first, in transforming the same into slag fibers, and then desulphurizing or fritting said slag fibers, substantially as set forth.

2. As a new article of manufacture, desulphurized and fritted slag fibers, substantially as described.

In testimony that I claim the foregoing as my invention I have signed my name in presence of two subscribing witnesses.

ALEXANDER D. ELBERS.

Witnesses:
CARL KARP,
SIDNEY MANN.